(12) United States Patent
Suzuki (10) Patent No.: US 12,061,736 B2
(45) Date of Patent: Aug. 13, 2024

(54) INFORMATION PROCESSING APPARATUS

(71) Applicant: FUJIFILM Business Innovation Corp., Tokyo (JP)

(72) Inventor: Kenji Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 535 days.

(21) Appl. No.: 17/323,623

(22) Filed: May 18, 2021

(65) Prior Publication Data

US 2022/0187910 A1 Jun. 16, 2022

(30) Foreign Application Priority Data

Dec. 16, 2020 (JP) ................................. 2020-208707

(51) Int. Cl.
*G06F 3/01* (2006.01)
*G06T 7/20* (2017.01)
*G06T 7/73* (2017.01)

(52) U.S. Cl.
CPC .............. *G06F 3/013* (2013.01); *G06F 3/017* (2013.01); *G06T 7/20* (2013.01)

(58) Field of Classification Search
CPC .................... G06F 3/011–013; G06F 3/017
See application file for complete search history.

(56) References Cited

U.S. PATENT DOCUMENTS

| 9,201,512 | B1* | 12/2015 | Raffle .................... G06F 3/033 |
| 11,294,475 | B1* | 4/2022 | Pinchon ................ G06F 3/0338 |
| 11,450,113 | B1* | 9/2022 | Vaziri ................ G02B 27/0172 |
| 2018/0246568 | A1* | 8/2018 | Holz ..................... G06V 40/20 |
| 2018/0364810 | A1* | 12/2018 | Parshionikar ........... G06F 3/013 |
| 2021/0173480 | A1* | 6/2021 | Osterhout ........... G06F 3/04815 |
| 2022/0187910 | A1* | 6/2022 | Suzuki ..................... G06T 7/73 |
| 2023/0016490 | A1* | 1/2023 | Berkebile ............... G06F 3/011 |
| 2023/0200715 | A1* | 6/2023 | Ofer ...................... A61B 3/0041 600/544 |

FOREIGN PATENT DOCUMENTS

| JP | 2002-310617 A | 10/2002 |
| JP | 2015-064751 A | 4/2015 |

* cited by examiner

*Primary Examiner* — Patrick F Marinelli
(74) *Attorney, Agent, or Firm* — Oliff PLC (57) ABSTRACT

An information processing apparatus includes: a processor configured to: acquire a moving image captured by an image capturing device attached to an operator; detect an eyeball movement of the operator using a sensor attached to the operator; and specify, from among the acquired moving image, a portion that was captured when a speed of the detected eyeball movement satisfied a predetermined condition as a boundary between actions of the operator.

20 Claims, 9 Drawing Sheets

| WORK AREA | TYPE OF ACTION |
|---|---|
| C1 | ACTION OF REACHING PART E1 (Reach 1) |
| C2 | ACTION OF REACHING PART E2 (Reach 2) |
| C3 | ACTION OF REACHING PART E3 (Reach 3) |
| W1 | ACTION OF ATTACHING PART E1 (Attach 1) |
| W2 | ACTION OF ATTACHING PART E2 (Attach 2) |
| W3 | ACTION OF ATTACHING PART E3 (Attach 3) |

| No. | START | END | x COORDINATE | y COORDINATE | C1 | W1 | C2 | W2 | C3 | W3 | TARGET |
|---|---|---|---|---|---|---|---|---|---|---|---|
| 1 | 0 | 1.2 | 230 | 400 | 100 | 800 | 1600 | 1300 | 1100 | 1000 | C1 |
| 2 | 1.2 | 2.1 | 750 | 700 | 500 | 110 | 700 | 600 | 400 | 400 | W1 |
| 3 | 2.1 | 3.5 | 800 | 710 | 700 | 100 | 500 | 550 | 300 | 300 | W1 |
| 4 | 3.5 | 4.3 | 1600 | 390 | 1600 | 900 | 90 | 600 | 500 | 700 | C2 |
| 5 | 4.3 | 5.8 | 1300 | 800 | 1100 | 300 | 900 | 100 | 700 | 300 | W2 |
| 6 | 5.8 | 7.0 | 1200 | 690 | 700 | 290 | 1000 | 120 | 600 | 290 | W2 |
| 7 | 7.0 | 8.5 | 1100 | 350 | 1000 | 1000 | 600 | 400 | 100 | 500 | C3 |
| 8 | 8.5 | 9.4 | 1050 | 700 | 1200 | 400 | 1000 | 350 | 800 | 50 | W3 |

| WORK TARGET | TYPE OF ACTION |
|---|---|
| PART E1 | ACTION OF REACHING PART E1 AND ATTACHING PART E1 TO MAIN BODY |
| PART E2 | ACTION OF REACHING PART E2 AND ATTACHING PART E2 TO MAIN BODY |
| PART E3 | ACTION OF REACHING PART E3 AND ATTACHING PART E3 TO MAIN BODY |

INFORMATION PROCESSING APPARATUS

CROSS-REFERENCE TO RELATED APPLICATIONS

This application is based on and claims priority under 35 USC 119 from Japanese Patent Application No. 2020-208707 filed Dec. 16, 2020.

BACKGROUND

(i) Technical Field

The present disclosure relates to an information processing apparatus.

(ii) Related Art

JP-A-2002-310617 discloses a technique that determines a start and end of an action from absolute coordinates of an identification marker attached to an operator in an image, and calculates standard time using standard time master data for setting the standard time corresponding to a distance when the operator moves.

SUMMARY

Examples of a method for capturing work being performed by an operator include (i) a method of capturing the work with a fixed image capturing device and (ii) a method of capturing the work with an image capturing device attached to an operator. In the latter case, with the above technique, the identification marker is not always included in a capturing region of the image capturing device, so that it may not be possible to distinguish actions.

Therefore, aspects of non-limiting embodiments of the present disclosure relate to distinguish actions regardless of an orientation of an image capturing device attached to an operator.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: acquire a moving image captured by an image capturing device attached to an operator; detect an eyeball movement of the operator using a sensor attached to the operator; and specify, from among the acquired moving image, a portion that was captured when a speed of the detected eyeball movement satisfied a predetermined condition as a boundary between actions of the operator.

BRIEF DESCRIPTION OF THE DRAWINGS

Exemplary embodiment(s) of the present disclosure will be described in detail based on the following figures, wherein.

DETAILED DESCRIPTION

[1] Exemplary Embodiment

Figure 1:
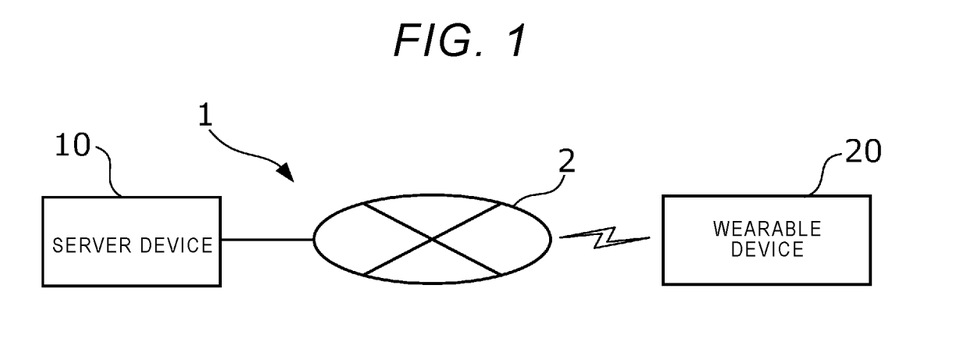
FIG. 1 is a diagram illustrating an overall configuration of a work management system according to an exemplary embodiment.

FIG. 1 illustrates an overall configuration of a work management system 1 according to an exemplary embodiment. The work management system 1 is a system for managing a work performed by an operator. Specifically, the work management system 1 captures the work as a moving image, decomposes the captured moving image into parts where individual work is performed such that the parts help evaluation and improvement of each work. The work management system 1 includes a communication line 2, a server device 10, and a wearable device 20.

The communication line 2 is a communication system including a mobile communication network and the Internet, and relays data exchange between devices (specifically, devices, terminals, systems, and the like) that communicate with the own system. The server device 10 is connected to the communication line 2 by wired communication, and the wearable device 20 is connected to the communication line 2 by wireless communication. Communication between each device and the communication line 2 is not limited to the example illustrated in FIG. 1, and may be either the wired communication or the wireless communication.

The wearable device 20 is a device attached to and used by the operator, and in the present exemplary embodiment, the wearable device 20 is a glasses-type device. The wearable device 20 captures the work of the operator and performs measurement with a sensor for detecting movement of an eye of the operator specifically, eyeball movement). The server device 10 specifies a portion of the moving image that is a boundary between actions of the operator, based on a measurement result of the wearable device 20, decomposes the work according to the specified boundary so as to help the evaluation and the improvement of each work.

Figure 2:
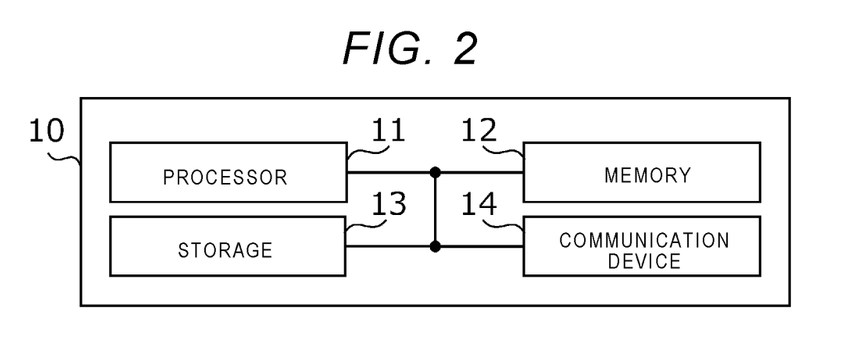
FIG. 2 is a diagram illustrating a hardware configuration of a server device.

FIG. 2 illustrates a hardware configuration of the server device 10. The server device 10 is a computer including a processor 11, a memory 12, a storage 13, and a communication device 14. The processor 11 includes, for example, an arithmetic device such as a central processing unit (CPU), a register, a peripheral circuit, and the like. The memory 12 is a recording medium that is readable by the processor 11. The memory 12 includes a random access memory (RAM), a read only memory (ROM), and the like.

The storage 13 is a recording medium that is readable by the processor 11. The storage 13 includes, for example, a hard disk drive or a flash memory. The processor 11 controls an operation of each hardware by executing a program stored in the ROM or the storage 13 using the RAM as a work area. The communication device 14 is a communication unit that includes an antenna, a communication circuit, and the like, and performs communication via the communication line 2.

Figure 3:
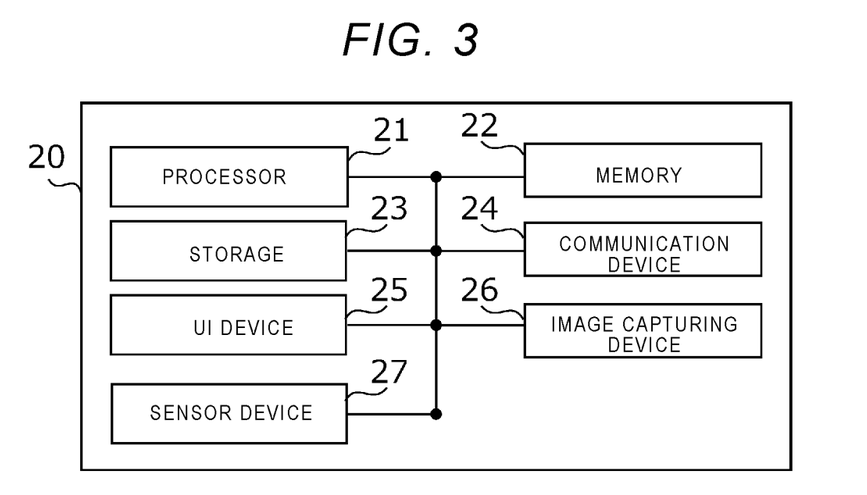
FIG. 3 is a diagram illustrating a hardware configuration of a wearable device.

FIG. 3 illustrates a hardware configuration of the wearable device 20. The wearable device 20 is a computer including a processor 21, a memory 22, a storage 23, a communication device 24, a user interface (UI) device 25, an image capturing device 26, and a sensor device 27. The processor 21 to the communication device 24 are hardware of the same type as the processor 11 to the communication device 14 illustrated in FIG. 2.

The UI device 25 is an interface provided to a user who uses the own device. In the present exemplary embodiment, the UI device 25 includes a lens of the own device, which is of the glasses type, and displays an image on the lens. Further, the UI device 25 includes a touch panel or a button provided on a rim, a bridge or a temple of the own device, and receives an operation from the user.

The image capturing device 26 includes an optical system, an image sensor, and the like, and captures the image based on light transmitted through the optical system and incident on the image sensor. The sensor device 27 is a device including a sensor for detecting the eyeball movement of the operator to which the own device is attached. As the sensor, for example, a complementary metal oxide semiconductor (CMOS) sensor or an electrooculography (EOG) for measuring the eyeball movement is used.

Specifically, when the sensor device 27 includes the CMOS sensor, the eyeball movement is measured by analyzing an image captured by the CMOS sensor mounted on a frame of the wearable device 20 which is the own device. The measured eyeball movement is processed by a well-known method, and the eyeball movement represented by coordinates on the image (first-person viewpoint image) captured by the image capturing device in a direction in which the operator gazes is measured.

When the sensor device 27 includes the electrooculography, the sensor device 27 includes two electrodes provided on right and left outer sides of the eyes of the operator, an amplifier, and the like, and measures a potential of each electrode. An eyeball has a certain potential difference called a corneoretinal potential, where a corneal side is positive and a retinal side is negative. The potential of each electrode is almost proportional to a rotation angle of the eyeball. Therefore, by using a rotation angle table in which the potential of each electrode and the rotation angle of the eyeball are associated with each other, the eyeball movement represented by the rotation angle of the eyeball is measured.

In the work management system 1, each function described below is implemented by executing a program and controlling the units by the processor of the above described devices. An operation performed by each function is also expressed as an operation performed by the processor of the device that implements the function.

Figure 4:
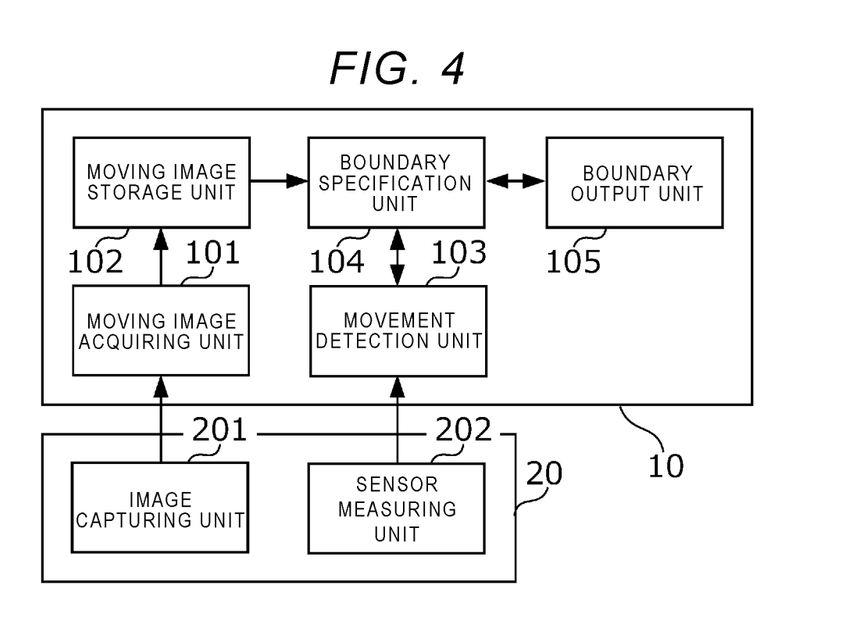
FIG. 4 is a diagram illustrating a functional configuration implemented in the exemplary embodiment.

FIG. 4 illustrates a functional configuration implemented in the present exemplary embodiment. The server device 10 includes a moving image acquiring unit 101, a moving image storage unit 102, a movement detection unit 103, a boundary specification unit 104, and a boundary output unit 105. The wearable device 20 includes an image capturing unit 201 and a sensor measuring unit 202.

The image capturing unit 201 of the wearable device 20 controls the image capturing device 26 and captures a moving image during work. The image capturing device 26 is provided with, for example, a lens facing the front of a face of the operator, and captures the moving image including a large part of the field of view of the operator. The image capturing unit 201 transmits the captured moving image and moving image data indicating a capturing time of each frame of the moving image to the server device 10.

The moving image acquiring unit 101 of the server device 10 acquires the moving image indicated by the transmitted moving image data, that is, the moving image captured by the image capturing device 26 attached to the operator and the capturing time. The moving image acquiring unit 101 supplies the acquired moving image and the capturing time of each frame to the moving image storage unit 102. The moving image storage unit 102 stores the supplied moving image in association with the supplied capturing time of each frame.

The sensor measuring unit 202 of the wearable device 20 controls the sensor device 27 to measure a value used for detecting the eyeball movement. In the present exemplary embodiment, the sensor measuring unit 202 measures the movement of the eyeballs and transmits measurement data indicating the measurement result to the server device 10. The movement detection unit 103 of the server device 10 detects the eyeball movement of the operator based on the measurement result indicated by the transmitted measurement data, that is, using the sensor attached to the operator.

As described above, the movement detection unit 103 measures the eyeball movement by, for example, analyzing the image captured by the CMOS sensor mounted on the frame of the own device. The movement detection unit 103 processes the measured eyeball movement by a well-known technique, to measure the eyeball movement in which a gaze direction of the operator is represented by the coordinates on the image (the first-person viewpoint image) captured by the image capturing device. The movement detection unit 103 supplies movement data indicating measured coordinates and a measurement time of the coordinates, to the boundary specification unit 104.

Further, the movement detection unit 103 may store the rotation angle table in which the potentials of the respective electrodes and the rotation angles of right and left eyeballs are associated with each other, and detect an eyeball movement represented by a rotation angle of each of right and left eyeballs associated with the measurement result in the rotation angle table. The movement detection unit 103 supplies the movement data indicating the rotation angles of the right and left eyeballs, which are detection results of the eyeball movement, and a detection time of the rotation angles, to the boundary specification unit 104.

The boundary specification unit 104 specifies, from among the moving image acquired by the moving image acquiring unit 101, a portion that was captured when a speed of the eyeball movement detected by the movement detection unit 103 satisfied a predetermined condition as a boundary between actions of the operator. The boundary specification unit 104 measures the speed of the eyeball movement, for example, by dividing an amount of change in the rotation angle indicated by the supplied movement data by a difference in the detection time.

In the present exemplary embodiment, the boundary specification unit 104 uses the following two conditions. A first one of the two conditions (hereinafter, referred to as a "first condition") is satisfied when blinking is detected. A method for detecting the blinking will be described with reference to FIG. 5.

Figure 5:
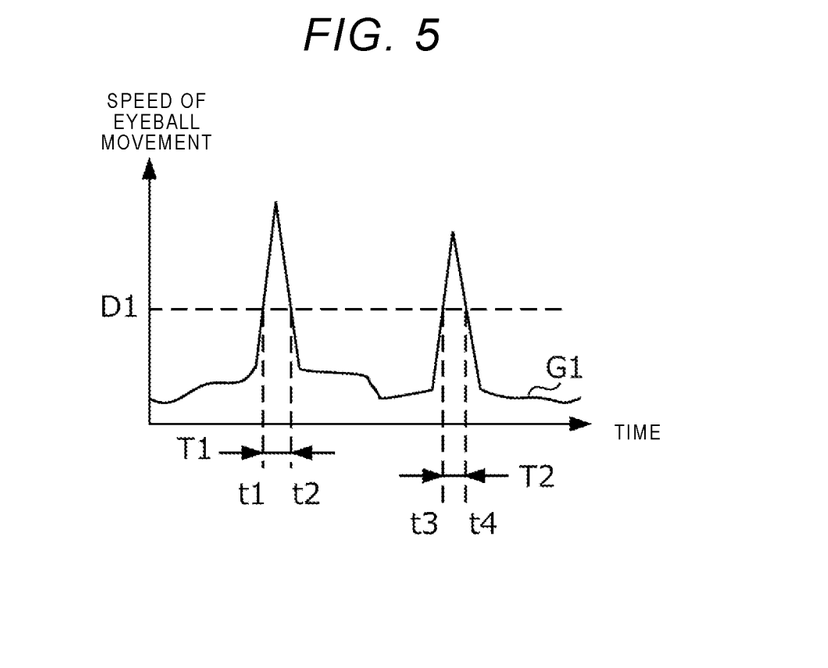
FIG. 5 is a diagram illustrating a speed of an eyeball movement representing blinking.

FIG. 5 is a diagram illustrating a speed of an eyeball movement representing blinking. FIG. 5 illustrates a graph in which a horizontal axis represents a time and a vertical axis represents the speed of the eyeball movement.

The graph illustrates a threshold D1 of the speed of the eyeball movement. A polygonal line G1 indicating a change in the speed of the eyeball movement exceeds (rises above) the threshold D1 at time t1 and falls below the threshold D1 at time t2. Similarly, the rising is measured at time t3 and the falling is measured at time t4. The boundary specification unit 104 detects that the blinking occurs during a period from the rising to the falling.

The boundary specification unit 104 is an example of "a detector configured to detect blinking" of the present disclosure. The boundary specification unit 104 determines that the first condition is satisfied when detecting the blinking, and specifies a portion that was captured when the first condition was satisfied as a boundary between actions of the operator. The boundary specification unit 104 specifies, for example, a portion whose capturing time is a time at which the rising or falling is measured, as the portion that was captured when the first condition was satisfied, that is, the boundary between the actions of the operator.

A second one of the two conditions (hereinafter, referred to as "second condition") is satisfied when the speed of the eyeball movement indicating a fixation state is measured. The fixation state is a state in which a line of sight is fixed at one point. The speed of the eyeball movement representing the fixation state will be described with reference to FIG. 6.

Figure 6:
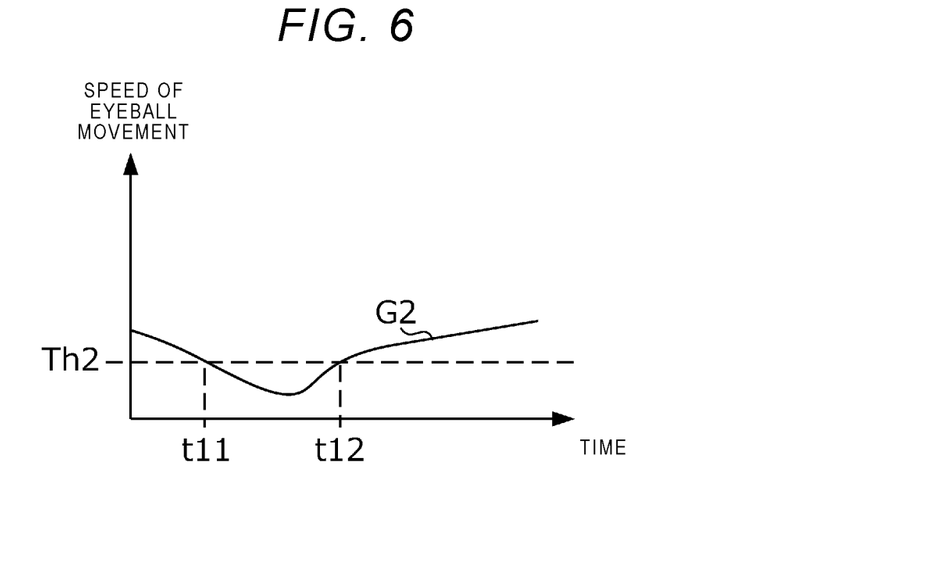
FIG. 6 is a diagram illustrating a speed of an eyeball movement representing a fixation state.

FIG. 6 is a diagram illustrating the speed of the eyeball movement representing the fixation state. FIG. 6 illustrates a graph in which a horizontal axis represents the time and a vertical axis represents the speed of the eyeball movement.

The graph illustrates a polygonal line G2 indicating a change in the speed of the eyeball movement. The speed of the eyeball movement representing the fixation state is, for example, a speed equal to or less than a threshold D2. The speed indicated by the polygonal line G2 falls below the threshold D2 at time t11 and exceeds the threshold D2 at time t12. The boundary specification unit 104 sets a period from time t11 to t12 when the speed is the threshold D2 or less as the period of the fixation state, and specifies a portion whose capturing time is the start time t11 of the fixation state as a boundary between actions of the operator.

In this way, the boundary specification unit 104 specifies the start time of the fixation state detected when the second condition is satisfied as the boundary between the actions of the operator. The boundary specification unit 104 may specify an end time of the fixation state detected when the second condition is satisfied as a boundary between operations of the operator. The boundary specification unit 104 supplies boundary data indicating the specified boundary to the boundary output unit 105.

The boundary output unit 105 outputs the supplied boundary data, that is, data indicating the boundary between the actions of the operator specified by the boundary specification unit 104. The boundary output unit 105 outputs the boundary data to, for example, a user terminal (not illustrated) used by a work manager.

Figure 7:
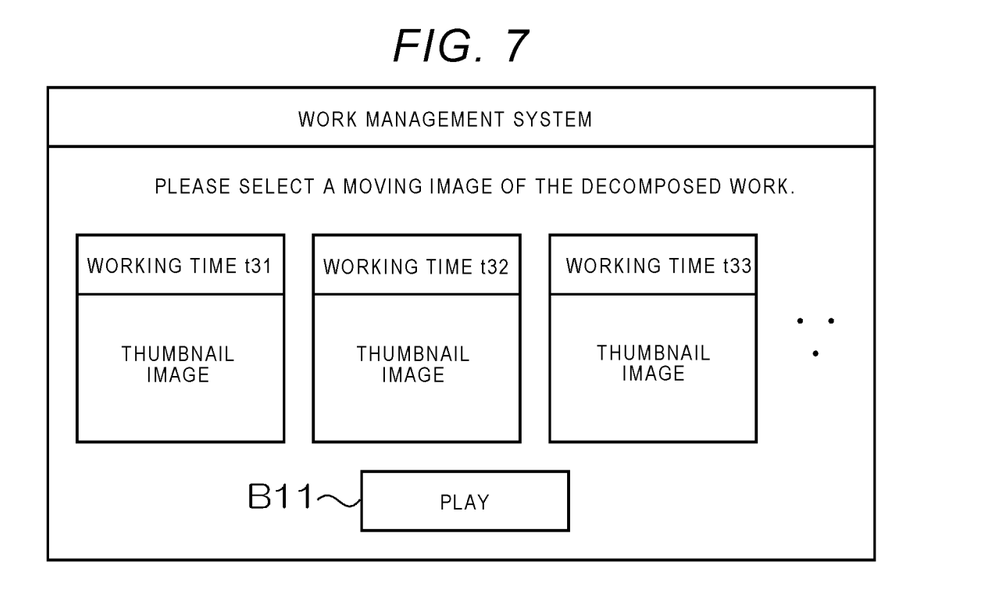
FIG. 7 is a diagram illustrating an example of output boundary data.

FIG. 7 illustrates an example of the output boundary data. In the example of FIG. 7, the user terminal displays a character string "please select a moving image of the decomposed work", working times at which moving images of the decomposed work were captured, thumbnail images of the moving images, and a play button B11 on a screen of the work management system. When an action of pressing the play button B11 is performed in a state where any of the thumbnail images is selected, the user terminal reproduces a work portion of the moving image that corresponds to the selected thumbnail image. The work manager watches the reproduced moving image to check productivity, safety, and the like in units of work.

Each device in the work management system 1 performs specific processing that specifies a boundary in a work with the above configuration.

Figure 8:
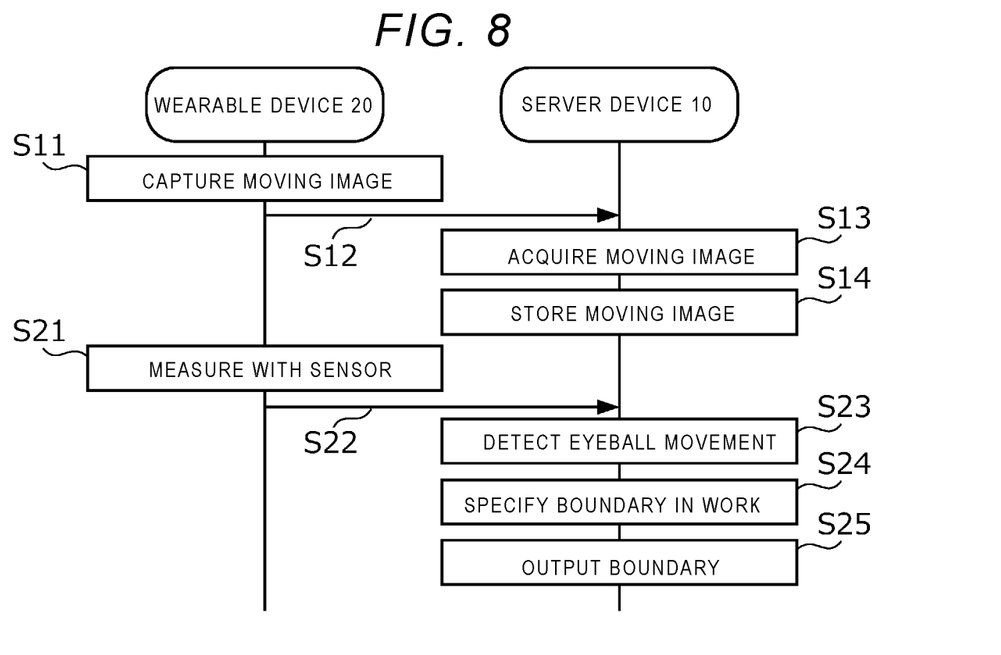
FIG. 8 is a diagram illustrating an example of an action procedure in specific processing.

FIG. 8 illustrates an example of an operation procedure in the specific processing. First, the wearable device 20 (specifically, the image capturing unit 201) captures a moving image during work (step S11), and transmits moving image data indicating the captured moving image to the server device 10 (step S12).

The server device 10 (specifically, the moving image acquiring unit 101) acquires the moving image indicated by the transmitted moving image data (step S13). Next, the server device 10 (specifically, the moving image storage unit 102) stores the acquired moving image in association with the capturing time (step S14). Subsequently, the wearable device 20 (specifically, the sensor measuring unit 202) measures values used for detecting the eyeball movement (step S21), and transmits measurement data indicating the measurement result to the server device 10 (step S22).

The server device 10 (specifically, the movement detection unit 103) detects the eyeball movement of the operator based on the measurement result indicated by the transmitted measurement data (step S23). Next, the server device 10 (specifically, the boundary specification unit 104) specifies a portion that was captured when the speed of the detected eyeball movement satisfied the predetermined condition as a boundary between actions of the operator, from among the acquired moving image (step S24). Then, the server device 10 (specifically, the boundary output unit 105) outputs data indicating the specified boundary between the actions of the operator (step S25).

In the present exemplary embodiment, as described above, the boundary between the actions in the moving image captured by the image capturing device attached to the operator is specified based on the eyeball movement detected by the sensor attached to the operator. Therefore, the actions can be distinguished regardless of the orientation of the image capturing device attached to the operator.

In order to carry out the work smoothly, the operator does not blink as much as possible during the work, and tends to blink between the works. In the present exemplary embodiment, as described above, by specifying the portion that was captured when the blinking was detected as the boundary between the actions of the operator, the boundary between the actions is more reliably specified as compared with a case where the blinking is not considered.

In addition, some work is performed while the operator is gazing at a specific portion. For example, the work of visually inspecting a product is performed while the operator is gazing at the product delivered in front of the eyes. In the present exemplary embodiment, as described above, by specifying the portion that was captured when the eyeball movement indicating the fixation state was detected as the boundary between the actions of the operator, the portion of the work performed by gazing at the specific portion is extracted from the moving image.

[2] Modifications

The above exemplary embodiment is merely an example of carrying out the present disclosure, and may be modified as follows. Further, the exemplary embodiment and the modifications may be carried out in combination as necessary.

[2-1] Types of Actions

In the exemplary embodiment, the boundary between the actions is specified. Furthermore, types of the actions may be determined.

Figure 9:
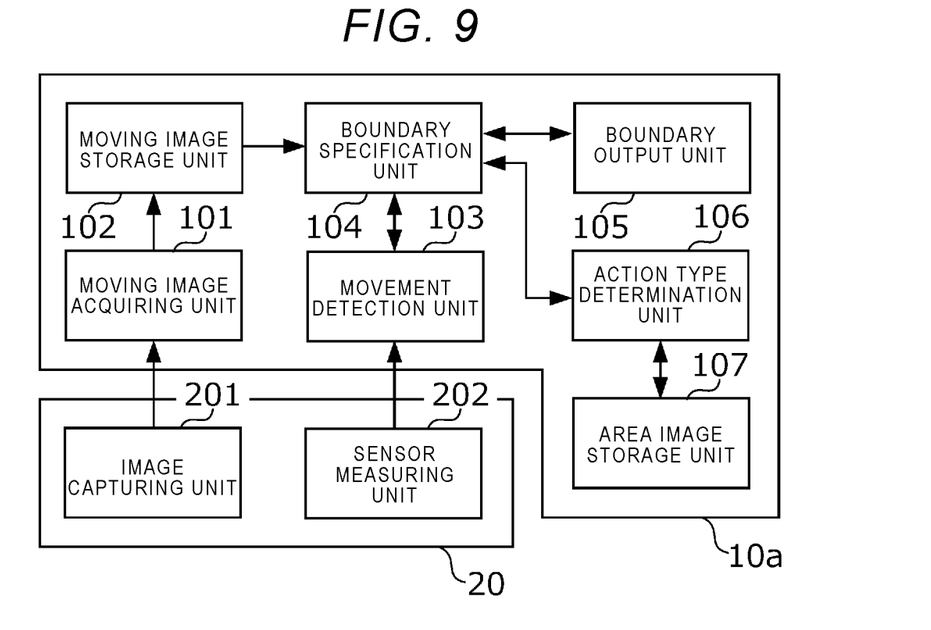
FIG. 9 is a diagram illustrating a functional configuration implemented in a modification.

FIG. 9 illustrates a functional configuration implemented in the present modification. FIG. 9 illustrates a server device 10a including an action type determination unit 106 and an area image storage unit 107, and the wearable device 20, in addition to the respective units illustrated in FIG. 4.

The image capturing unit 201 captures a moving image of work areas of the operator. The image capturing unit 201 transmits the captured moving image and moving image data indicating a capturing time of each frame of the moving image to the server device 10a. The moving image acquiring unit 101 of the server device 10a acquires (i) the moving image indicated by the transmitted moving image data, that is, the moving image of the work area captured by the wearable device 20 attached to the operator and (ii) the capturing time.

The area image storage unit 107 stores in advance a still image of the work areas (hereinafter, referred to as a "work area image") captured from directly above a workbench A1 by a camera different from the wearable device 20. The wearable device 20 referred to here is an example of the "image capturing device attached to the operator" of the present disclosure, and the camera different from the wearable device 20 is an example of "another image capturing device" of the present disclosure.

End portions or top points of the workbench may be identified from the still image captured by the image capturing unit 201 of the wearable device 20, and the captured still image (specifically, the work areas) may be converted into an image having a rectangular shape. The area image storage unit 107 may store the image having the rectangular shape as the work area image. The area image storage unit 107 may attach a marker for position correction to a predetermined position in each work area, and store an image obtained by converting the captured image into a rectangular work area image based on the markers, as the work area image.

The action type determination unit 106 of the server device 10a determines a type of each action of the operator based on a positional relationship between a position, in an image, of a gazing point indicated by the eyeball movement detected by the boundary specification unit 104 and the work areas indicated by the work area image stored in the area image storage unit 107. The action type determination unit 106 determines the type of each action of the operator based on, for example, whether the position of the gazing point is included in a predetermined region around each work area. A determination method will be described with reference to FIGS. 10 to 13.

Figure 10:
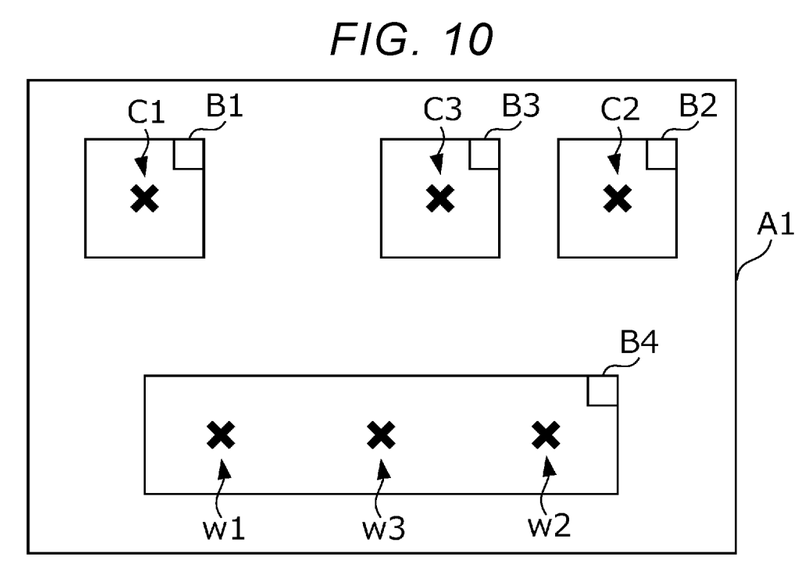
FIG. 10 is a diagram illustrating an example of a work area.

FIG. 10 illustrates an example of the work area. Specifically, FIG. 10 illustrates the work area image of the workbench A1. The workbench A1 is provided with work areas C1, C2, and C3 and work areas W1, W2, and W3. Markers B1, B2, B3 and B4 are provided in the work areas to facilitate specifying a position in a space. Each marker is, for example, a QR code (registered trademark).

The work areas C1, C2, and C3 are areas in which parts are arranged, and actions of reaching the parts are performed. The work areas W1, W2, and W3 are areas where actions of attaching the parts to a main body is performed. When the operator works on the workbench A1, the gazing point of the operator moves in small steps at a high speed.

The action type determination unit 106 calculates, for each frame of the moving image captured by the wearable device 20, a projective transformation matrix from the moving image to a still image based on the positions of the markers. Then, the action type determination unit 106 maps a position of the gazing point on the moving image onto the still image, and calculates the coordinates of the position of the gazing point on the still image.

Figure 11:
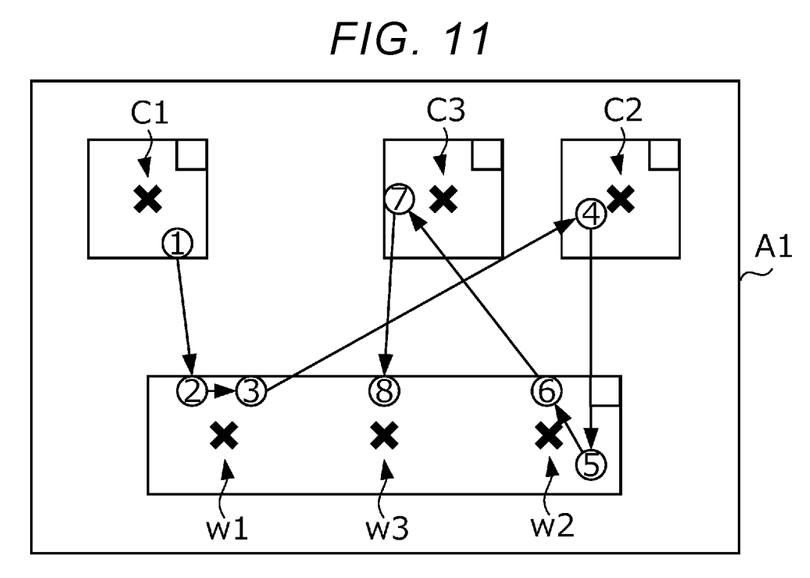
FIG. 11 is a diagram illustrating an example of a transition of a gazing point of an operator.

FIG. 11 illustrates an example of a transition of the gazing point of the operator. In the example of FIG. 11, first, a gazing point 1 appears in the work area C1, and a gazing point 2 and a gazing point 3 appear in the working area W1. Next, a gazing point 4 appears in the work area C2, and a gazing point 5 and a gazing point 6 appear in the working area W2. Then, a gazing point 7 appears in the work area C3, and a gazing point 8 appears in the work area W3. When there is a work area including the calculated gazing point, the action type determination unit 106 determines that a type of an action in question is a type of an action associated with the work area. The action type determination unit 106 uses an action table in which the work areas and the types of the actions are associated with each other.

Figure 12:
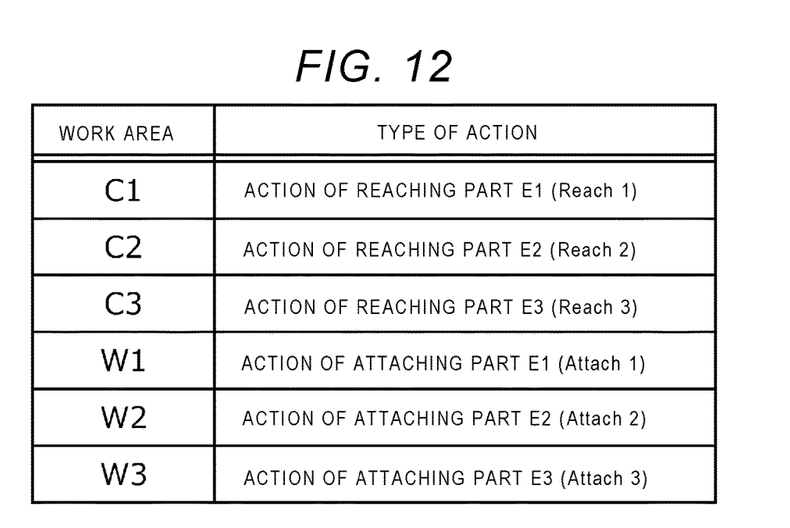
FIG. 12 is a diagram illustrating an example of an action table.

FIG. 12 illustrates an example of the action table. In the example of FIG. 12, the work areas "C1", "C2", "C3", "W1", "W2", and "W3" are associated with types of actions, that is, "an action of reaching a part E1 (Reach 1)", "an action of reaching a part E2 (Reach 2)", "an action of reaching a part E3 (Reach 3)", "an action of attaching the part E1 (Attach 1)", "an action of attaching the part E2 (Attach 2)", and "an action of attaching the part E3 (Attach 3)", respectively.

For example, when the gazing point 1 included in the work area C1 is calculated, the action type determination unit 106 determines that the type of the action in question is the "action of reaching the part E1" associated with the work area C1. When the gazing point 5 or the gazing point 6 included in the work area W2 is calculated, the action type determination unit 106 determines that the type of the action in question is the "action of attaching the part E2" associated with the work area W2.

Figure 13:
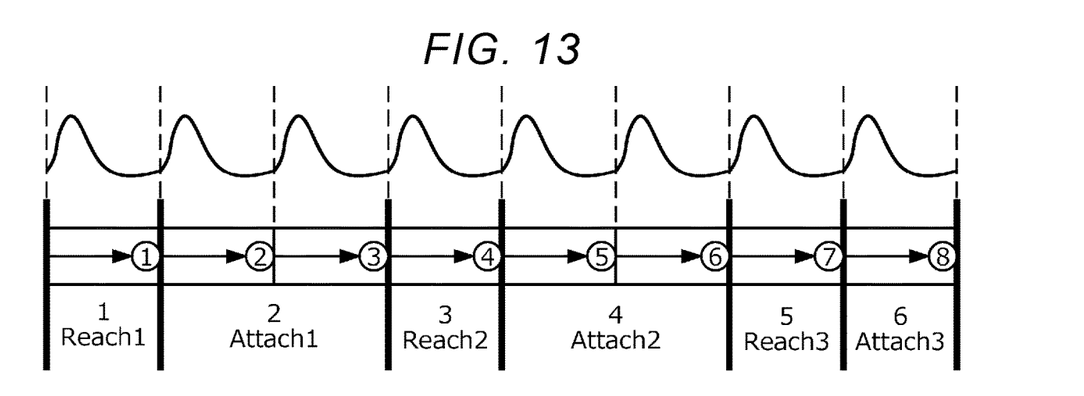
FIG. 13 is a diagram illustrating an example of determined types of actions.

FIG. 13 illustrates an example of determined types of actions. Specifically, FIG. 13 illustrates, in chronological order, a transition of the speed of the eyeball movement, a timing at which eight gazing points from the gazing point 1 to the gazing point 8 appear, and determined types of actions. For example, at the timing when the gazing point 4 appears, the action type determination unit 106 determines that the action at that time is Reach 2 (that is, the action of reaching the part E2). Further, at the timing when the gazing point 8 appears, the action type determination unit 106 determines that the action at that time is Attach 3 (that is, the action of attaching the part E3).

In this way, the action type determination unit 106 determines a type of each action of the operator based on the positional relationship between the position in the image of the gazing point and the work area. As a result, a more appropriate processing result can be obtained, that is, a more appropriate type of each action can be determined from the images including the work areas as compared with a case where the positional relationship is not taken into consideration. The action type determination unit 106 determines the type of each action of the operator based on whether the position of the gazing point is included in a predetermined region around each work area. Since this region is determined according to the shape of each work area, the more appropriate processing result can be obtained, that is, the more appropriate type of each action can be determined even if the work area has any shape.

Figure 14:
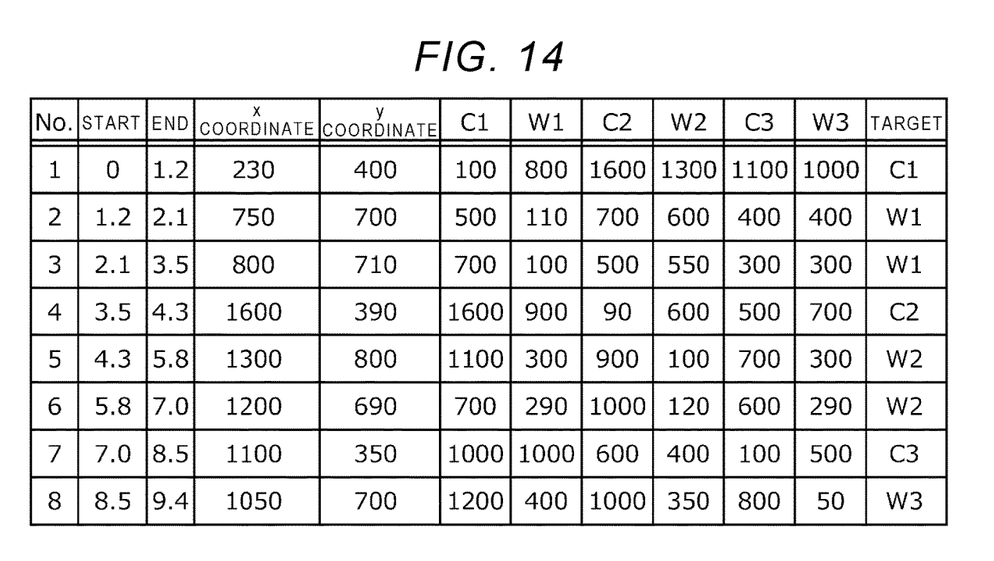
FIG. 14 is a diagram illustrating an example of stored information on the gazing points and distances to representative positions.

The action type determination unit 106 may determine representative positions of the work areas and determine the type of each action of the operator based on distances between the representative positions and the position of the gazing point. Each time the gazing point moves, the action type determination unit 106 stores information on gazing points and the distances to the representative positions in association with each other.

FIG. 14 illustrates an example of stored information on the gazing points and the distances to the representative positions. For example, FIG. 14 illustrates that the gazing point 1 starts at 0.0 seconds and ends at 1.2 seconds, that the coordinates of the gazing point 1 are (x, y)=(230, 400), that the distances between the gazing point 1 and the representative positions of the work areas C1, W1, C2, W2, C3, and W3 are 100, 800, 1600, 1300, 1100, and 1000, respectively.

The action type determination unit 106 determines that a type of an action in question is a type of an action associated with a work area having a representative position whose distance from the position of the gazing point is less than a threshold. This threshold is hereinafter referred to as a "determination threshold". For example, it is assumed that the action table of FIG. 12 is used and the determination threshold is 200. In this case, as for the gazing point 1, a work area having a representative point whose distance from the position of the gazing point 1 is less than the determination threshold is C1. Thus, the action type determination unit 106 determines that the type of the action in question is the "action of reaching the part E1 (Reach 1)" associated with the work area C1 in the action table. In this case, even when the shape of the work area is unclear, the more appropriate processing result can be obtained, that is, the more appropriate type of the action can be determined.

A fixed camera for capturing the work areas may be provided.

Figure 15:
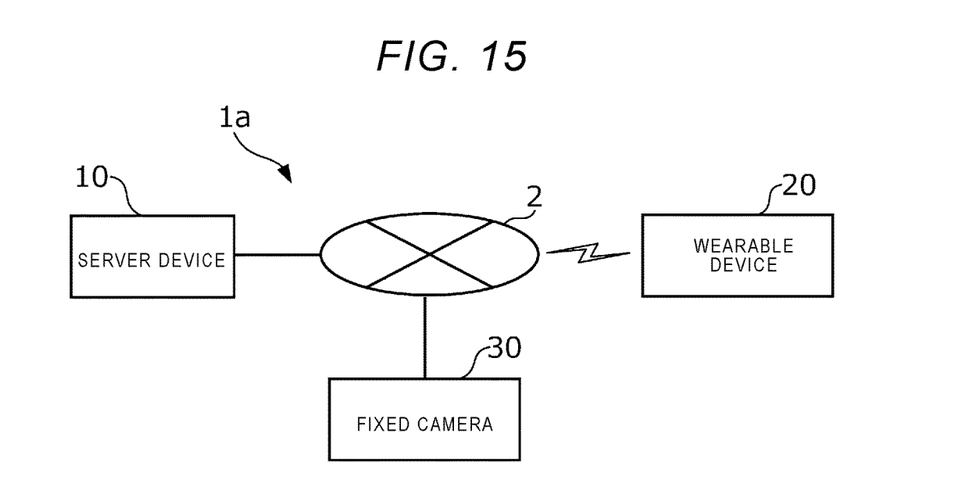
FIG. 15 is a diagram illustrating an overall configuration of a work management system according to the modification.

FIG. 15 illustrates an overall configuration of a work management system 1a according to the present modification. The work management system 1a includes a fixed camera 30 in addition to the respective devices illustrated in FIG. 1. The fixed camera 30 is an image capturing device that is fixed at a position where the image capturing device can capture the work areas of the operator. The fixed camera 30 is provided, for example, vertically above a center of the work area and captures an image vertically below the fixed camera 30.

The fixed camera 30 is connected to the communication line 2 by wired communication (may be wireless communication), and exchanges data with each device. The fixed camera 30 has a function equivalent to that of the image capturing unit 201 of the wearable device 20, and transmits moving image data obtained by capturing the work areas to the server device 10a. By fixing the camera such that the work area in a captured image has a rectangle shape in this way, a load of processing of mapping and converting the moving image of the work area is eliminated.

[2-2] Stop of Gazing Point

As the operator gets used to the work, the operator remembers the position of a next work area, so that the gazing point may stop in front of the work area without moving the line of sight to the work area. In that case, a distance between the position of the gazing point and the representative position of the next work area may be equal to or larger than the determination threshold, but a distance between the position of the gazing point and the representative position of another work area may be less than the determination threshold, which result in erroneous determination of a type of an action.

Figure 16:
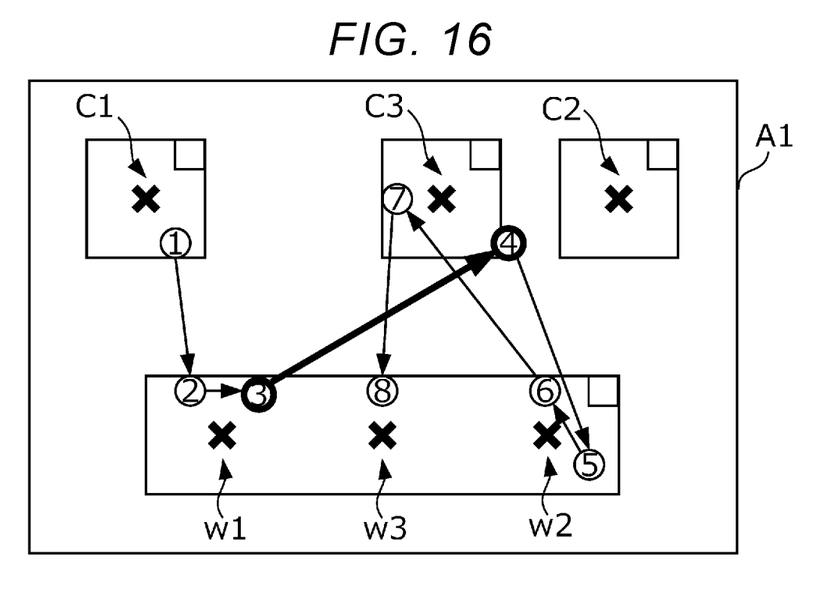
FIG. 16 is a diagram illustrating an example in which the gazing point stops in front of the work area.

FIG. 16 illustrates an example in which the gazing point stops in front of a work area. In the example of FIG. 16, the gazing point 4 stops in front of the representative position of the next work area C2.

Figure 17:
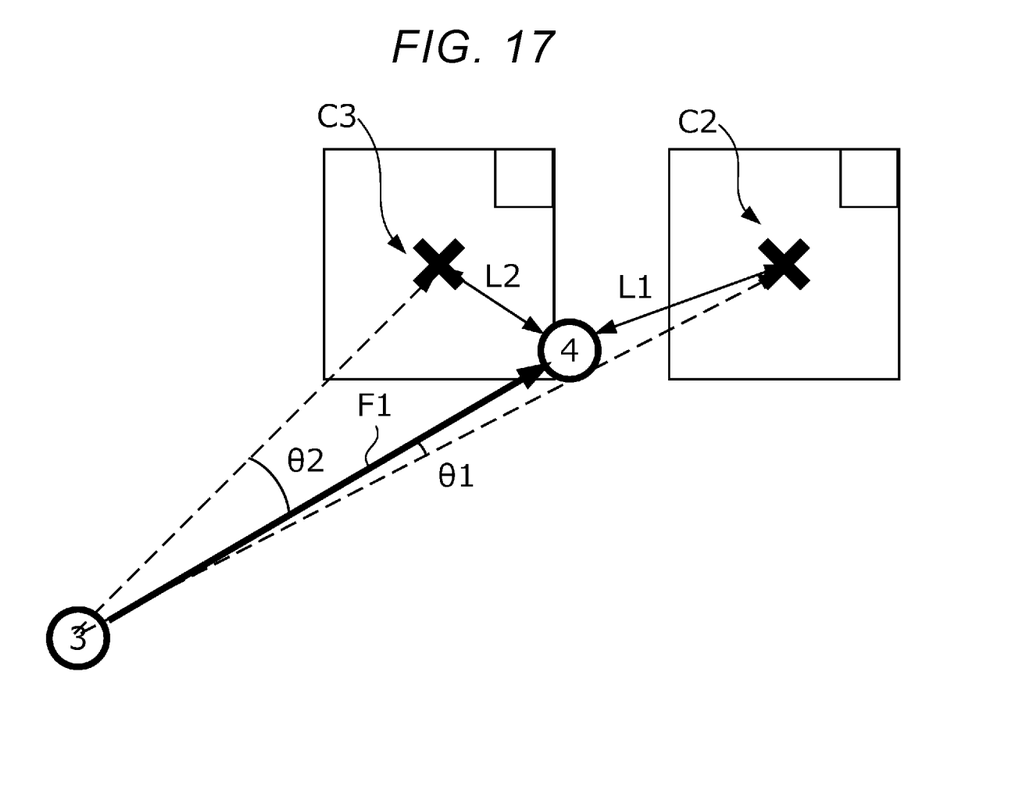
FIG. 17 is an enlarged view of a periphery of the gazing point.

FIG. 17 illustrates a periphery of the gazing point 4 in an enlarged manner. The gazing point 4 stops at a position where a distance L1 from the representative position of the work area C2 is the determination threshold or more and a distance L2 from the representative position of the work area C3 is less than the determination threshold.

In order to avoid the erroneous determination of a type of an action in this state, the action type determination unit 106 corrects distances between the representative positions and the position of the gazing point according to a moving direction of the position of the gazing point. In FIG. 17, an arrow from the gazing point 3 to the gazing point 4 represents a moving direction F1 of the gazing point. The action type determination unit 106 calculates an angle θ between a direction from a previous gazing point toward the representative position of each work area and the moving direction F1.

In the example of FIG. 17, the action type determination unit 106 calculates an angle θ1 between the direction from the gazing point 3 toward the representative position of the work area C2 and the moving direction F1, and an angle θ2 between the direction from the gazing point 3 toward the representative position of the work area C3 and the moving direction F1. The action type determination unit 106 corrects the distance using a coefficient α according to the angle θ.

Figure 18:
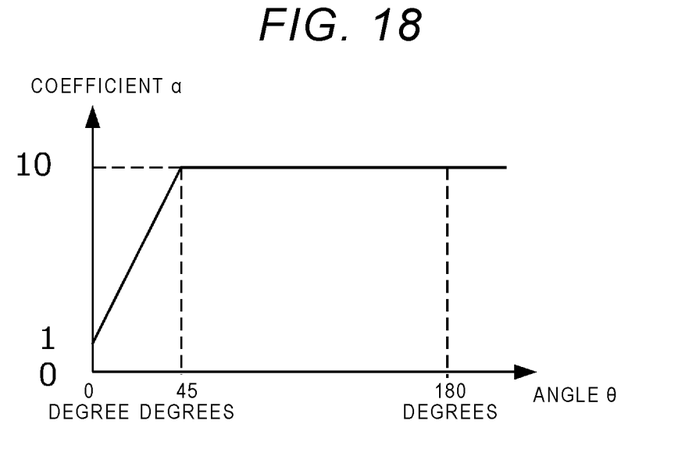
FIG. 18 is a diagram illustrating an example of a relationship between an angle $\theta$ and a coefficient $\alpha$.

FIG. 18 illustrates an example of a relationship between the angle θ and the coefficient α. In the example of FIG. 18, when the angle θ is 0 degree, the coefficient α is 1, and the coefficient α increases in proportion to the angle θ until the angle θ reaches 45 degrees, and when the angle θ is 45 degrees, the coefficient α is 10. When the angle θ exceeds 45 degrees, the coefficient α is fixed at 10. For example, it is assumed that the angle θ1 is 4.5 degrees, the angle θ2 is 18 degrees, the distance L1 is 0.2, and the distance L2 is 0.1. In this case, the action type determination unit 106 calculates corrected distances L1 and L2 in the following manner.

Corrected Distance $L1$ $= (4.5 \text{ degrees} \div 45 \times 9 + 1) \times \text{Distance } L1$ $= 1.9 \times 0.2$ $= 0.38$ Corrected Distance $L2$ $= (18 \text{ degrees} \div 45 \times 9 + 1) \times \text{Distance } L2$ $= 4.6 \times 0.1$ $= 0.46$ Here, the distances L1 and L2 are normalized distances with a screen width of the still image set to 1.

The action type determination unit 106 determines whether each of the corrected distance L1 and the corrected distance L2 is the determination threshold or more. In this example, when the distance L1 and the distance L2 are compared, the distance L2 is smaller than the distance L1. However, comparing the corrected distance L1 and the corrected distance L2, the corrected distance L1 has a smaller value than the corrected distance L2. Accordingly, it can be determined that the line of sight is directed to L1. According to the present modification, it is prevented that an erroneous processing result is obtained when the operator gets used to the work, that is, it is prevented that a type of an action is erroneously determined, as compared with the case where the distances are not corrected.

[2-3] Positional Relationship with Work Target

When determining a type of an action, the action type determination unit 106 first recognizes a position of a work target from the moving image acquired by the moving image acquiring unit 101. The action type determination unit 106 stores, for example, sample images of work targets such as the parts, and specifies a work target represented by one of the sample images having a similar feature used in image recognition.

The action type determination unit 106 stores image features of the work targets in advance, and calculates a distance and direction to the specified work target based on the image feature and position of the specified work target in the moving image. Then, the action type determination unit 106 calculates the coordinates of the work target in a three-dimensional space based on the calculated distance and direction, and recognizes the position of the work target based on the calculated coordinates. The action type determination unit 106 determines a type of an action based on the positional relationship between the position, in the moving image, of the gazing point indicated by the eyeball movement detected by the boundary specification unit 104 and the position of the recognized work target.

For example, assuming that the calculated distance to the work target is the distance to the gazing point, the action type determination unit 106 specifies the position, in the moving image, of the gazing point according to the rotation angle of the eyeball representing the eyeball movement detected by the movement detection unit 103. The action type determination unit 106 determines the type of the action of the operator based on, for example, whether the specified position of the gazing point is included in the predetermined region around the position of the recognized work target.

For example, the action type determination unit 106 stores a shape and image feature of an area required for a work for each work target, and determines the area including the recognized position of the work target as the above described region. When the specified position of the gazing point is included in the predetermined region, the action type determination unit 106 determines that the type of the action in question is the type of the action associated with the region. The action type determination unit 106 uses an action table in which the work targets and the types of the actions are associated with each other.

Figure 19:
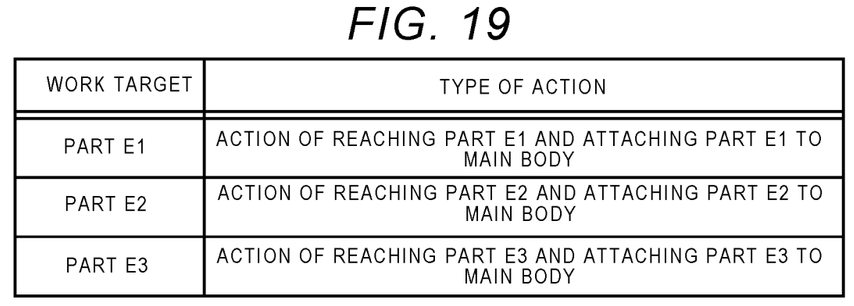
FIG. 19 is a diagram illustrating an example of an action table according to the modification.

FIG. 19 illustrates an example of the action table according to the present modification. In the example of FIG. 19, the work targets "part E1", "part E2", and "part E3" are associated with types of actions of "an action of reaching the part E1 and attaching the part E1 to the main body", "an action of reaching the part E2 and attaching the part E2 to the main body", and "an action of reaching the part E3 and attaching the part E3 to the main body", respectively.

For example, when the gazing point 1 included in the predetermined region around the part E1, which is the work target, is calculated, the action type determination unit 106 determines that the type of the action in question is the "action of reaching the part E1 and attaching the part E1 to the main body" associated with the part E1. Further, when the gazing point 2 included in the predetermined region around the part E2, which is the work target, is calculated, the action type determination unit 106 determines that the type of the action in question is the "action of reaching the part E2 and attaching the part E2 to the main body" associated with the part E2.

In this way, in the present modification, the action type determination unit 106 determines the type of the action of the operator based on the positional relationship between the position, in the moving image, of the gazing point and the position of the work target. Since the position of the work target is recognized from the moving image, according to the present modification, even when the fixed image capturing device is not provided, the more appropriate processing result can be obtained, that is, the more appropriate type of the action can be determined as compared with the case where the positional relationship is not taken into consideration.

The action type determination unit 106 determines the type of the action of the operator based on whether the position of the gazing point is included in the predetermined region around the position of the work target. By determining this region according to the shape and size of the area required for the work on the work target, the more appropriate processing result can be obtained, that is, the more appropriate type of the action can be determined even if the area required for the work has any shape.

The action type determination unit 106 may determine the coordinates representing the position of the work target, and determine the type of the action of the operator based on the distance between the coordinates and the position of the gazing point. The coordinates representing the position of the work target may be the coordinates of the position if there is only one recognized position of the work target, or may be the coordinates of a position deviated from the position in the determined direction and distance. If there are plural recognized positions of work targets, the coordinates representing the position of the work target may be the coordinates of the center of those positions.

The coordinates representing the position of the work target may be a position deviated from the center of the recognized positions of the plural work targets in the determined direction and distance. Each time the gazing point moves, the action type determination unit 106 stores the information on the gazing point and the distance to the representative coordinates in association with each other. The action type determination unit 106 determines that the type of the action in question is the type of the action associated with the work target for which determined are coordinates whose distance to the position of the gazing point is less than the determination threshold.

For example, when the work target having the representative coordinates whose distance to the position of the gazing point is less than the determination threshold is the part E1, the action type determination unit 106 determines that the type of the action in question is the "action of reaching the part E1 and attaching the part E1 to the main body" associated with the part E1 in the action table of FIG. 19. In this case, even when the shape of the work area is unclear, the more appropriate processing result can be obtained, that is, the more appropriate type of the action can be determined.

Also in the present modification, in order to address the case in which the gazing point stops in front of the area required for the work, the action type determination unit 106 may correct the distance between the representative coordinates and the position of the gazing point according to the moving direction of the position of the gazing point. This correction may be performed by a method described with reference to FIGS. 16 to 18. Accordingly, it is prevented that an erroneous processing result is obtained when the operator gets used to the work, that is, it is prevented that a type of an action is erroneously determined, as compared with the case where the distances are not corrected.

[2-4] Method of Specifying Boundary Between Actions

The boundary specification unit 104 may specify a boundary between actions by a method different from that of the exemplary embodiment. For example, when the wearable device 20 captures the moving image of the work areas of the operator, the boundary specification unit 104 specifies the boundary between the actions based on the positional relationships between the position, in the image, of the gazing point indicated by the detected eyeball movement and the work areas.

The boundary specification unit 104 specifies the boundary between the actions based on, for example, whether the position of the gazing point is included in the predetermined region around each work area. Specifically, the boundary specification unit 104 determines that the predetermined condition is satisfied when the position of the gazing point is changed from a state of not being included in the predetermined region to a state of being included in the predetermined region. As a result, the more appropriate processing result can be obtained, that is, the more appropriate boundary between the actions can be specified from the image including the work areas as compared with the case where the positional relationships between the position, in the image, of the gazing point and the work areas are not taken into consideration.

The boundary specification unit 104 may specify the boundary between the actions based on the distances between the representative positions of the work areas and the position of the gazing point. Specifically, when a state where a distance between a representative position and the position of the gazing point is the determination threshold or more is changed to a state where the distance is less than the determination threshold, the boundary specification unit 104 determines that the predetermined condition is satisfied, and specifies the boundary between the actions. As a result, even when the shape of the area required for the work is unclear, the more appropriate processing result can be obtained, that is, the more appropriate boundary between the actions can be specified.

The boundary specification unit 104 may correct the distances between the representative positions and the position of the gazing point according to the moving direction of the position of the gazing point. The distances may be corrected in a similar manner as in the above modification. Accordingly, it is prevented that an erroneous processing result is obtained when the operator gets used to the work, that is, it is prevented that a boundary between actions is erroneously specified, as compared with the case where the distances are not corrected.

Further, the boundary specification unit 104 may recognize the position of the work target from the moving image acquired by the moving image acquiring unit 101, and specify the boundary between the actions based on the positional relationship between the position, in the moving image, of the gazing point indicated by the eyeball movement detected by the boundary specification unit 104 and the recognized position of the work target. The boundary specification unit 104 specifies the boundary between the actions based on, for example, whether the position of the gazing point is included in the predetermined region around the recognized position of the work target.

Similar to the above modification, the boundary specification unit 104 stores the shape and size of the area required for the work for each work target, and determines the area including the recognized position of the work target as the above region. Then, the boundary specification unit 104 determines that the predetermined condition is satisfied when the specified position of the gazing point is changed from the state of not being included in the predetermined region to the state of being included in the predetermined region, and specifies the boundary between the actions.

As a result, similar to the above modification, even when the fixed image capturing device is not provided, the more appropriate processing result can be obtained, that is, the more appropriate boundary between the actions can be specified as compared with the case where the positional relationship between the position, in the moving image, of the gazing point and the position of the work target is not taken into consideration. By specifying the boundary based on whether the position of the gazing point is included in the predetermined region around the position of the work target, even if the area required for the work has any shape, the more appropriate processing result can be obtained, that is, the more appropriate boundary between the actions can be specified.

Further, the boundary specification unit 104 may determine the coordinates representing the position of the work target, and specify the boundary between the actions based on the distance between the coordinates and the position of the gazing point. When the state where the distance to the position of the gazing point is the determination threshold or more is changed to the state where the distance is less than the determination threshold, the boundary specification unit 104 determines that the predetermined condition is satisfied, and specifies the boundary between the actions. As a result, even when the shape of the work area is unclear, the more appropriate processing result can be obtained, that is, the more appropriate boundary between the actions can be specified.

Also in the present modification, in order to address the case in which the gazing point stops in front of the area required for the work, the boundary specification unit 104 may correct the distance between the representative coordinates and the position of the gazing point according to the moving direction of the position of the gazing point. This correction may be performed by a method described with reference to FIGS. 16 to 18. Accordingly, it is prevented that an erroneous processing result is obtained when the operator gets used to the work, that is, it is prevented that a boundary between actions is erroneously specified, as compared with the case where the distances are not corrected.

[2-5] Functional Configuration

The functional configurations implemented by the server device 10, the wearable device 20, and the fixed camera 30 are not limited to those illustrated in FIG. 4 or the like. For example, in the exemplary embodiment, the boundary specification unit 104 specifies the boundary between actions using the first condition and the cut using the second condition. Alternatively, these operations may be performed by different functions.

For example, one function may implement the operations performed by the moving image acquiring unit 101 and the moving image storage unit 102, and another function may implement the operations performed by the boundary specification unit 104 and the boundary output unit 105. The functions implemented by the server device 10 may be implemented by computer resources provided by two or more information processing apparatuses or cloud services. In short, if the functions illustrated in FIG. 4 and the like are implemented as a whole, the scope of the operations performed by each function and devices that implement the respective functions may be freely determined.

[2-6] Processor

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

[2-7] Category

The present disclosure may be regarded as an information processing method for implementing the processing performed by the information processing apparatus, in addition to the information processing apparatus called the server device and the wearable device. Also, the present disclosure may be regarded as a program for causing the computer to control the information processing apparatus. The program may be provided in a form of a recording medium such as an optical disc that stores the program, or may be provided in a form of being downloaded to a computer via a communication line such as the Internet, and being installed and made available.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to:
        acquire a moving image captured by an image capturing device attached to an operator;
        detect an eyeball movement of the operator using a sensor attached to the operator; and
        specify, from among the acquired moving image, a portion that was captured when a speed of the detected eyeball movement satisfied a predetermined condition as a boundary between actions of the operator.

2. The information processing apparatus according to claim 1, further comprising:
    a detector configured to detect blinking, wherein
    the processor is configured to specify a portion that was captured when the blinking was detected while the condition was satisfied, as the boundary between the actions of the operator.

3. The information processing apparatus according to claim 1, wherein
    the condition is satisfied when the speed of the eyeball movement indicating a fixation state of the operator is measured, and
    the processor is configured to specify a start time or an end time of the fixation state that was detected when the condition was satisfied, as the boundary between the actions of the operator.

4. The information processing apparatus according to claim 2, wherein
    the condition is satisfied when the speed of the eyeball movement indicating a fixation state of the operator is measured, and
    the processor is configured to specify a start time or an end time of the fixation state that was detected when the condition was satisfied, as the boundary between the actions of the operator.

5. The information processing apparatus according to claim 1, wherein
    the processor is configured to:
        acquire an image of work areas captured by another image capturing device different from the image capturing device attached to the operator; and
        determine a type of each action of the operator based on positional relationships between a position, in the image, of a gazing point indicated by the detected eyeball movement and the work areas.

6. The information processing apparatus according to claim 2, wherein
    the processor is configured to:
        acquire an image of work areas captured by another image capturing device different from the image capturing device attached to the operator; and
        determine a type of each action of the operator based on positional relationships between a position, in the image, of a gazing point indicated by the detected eyeball movement and the work areas.

7. The information processing apparatus according to claim 3, wherein
    the processor is configured to:
        acquire an image of work areas captured by another image capturing device different from the image capturing device attached to the operator; and
        determine a type of each action of the operator based on positional relationships between a position, in the image, of a gazing point indicated by the detected eyeball movement and the work areas.

8. The information processing apparatus according to claim 4, wherein
the processor is configured to:
acquire an image of work areas captured by another image capturing device different from the image capturing device attached to the operator; and
determine a type of each action of the operator based on positional relationships between a position, in the image, of a gazing point indicated by the detected eyeball movement and the work areas.

9. The information processing apparatus according to claim 5, wherein
the processor is configured to specify the boundary between the actions of the operator or determine the type of each action, based on whether the position of the gazing point is included in a predetermined region around each work area.

10. The information processing apparatus according to claim 6, wherein
the processor is configured to specify the boundary between the actions of the operator or determine the type of each action, based on whether the position of the gazing point is included in a predetermined region around each work area.

11. The information processing apparatus according to claim 7, wherein
the processor is configured to specify the boundary between the actions of the operator or determine the type of each action, based on whether the position of the gazing point is included in a predetermined region around each work area.

12. The information processing apparatus according to claim 8, wherein
the processor is configured to specify the boundary between the actions of the operator or determine the type of each action, based on whether the position of the gazing point is included in a predetermined region around each work area.

13. The information processing apparatus according to claim 5, wherein
the processor is configured to:
determine a representative position in each work area; and
specify the boundary between the actions of the operator or determine the type of each action, based on a distance between the representative position and the position of the gazing point.

14. The information processing apparatus according to claim 6, wherein
the processor is configured to:
determine a representative position in each work area; and
specify the boundary between the actions of the operator or determine the type of each action, based on a distance between the representative position and the position of the gazing point.

15. The information processing apparatus according to claim 7, wherein
the processor is configured to:
determine a representative position in each work area; and
specify the boundary between the actions of the operator or determine the type of each action, based on a distance between the representative position and the position of the gazing point.

16. The information processing apparatus according to claim 13, wherein
the processor is configured to correct the distance between the representative position and the position of the gazing point according to a moving direction of the position of the gazing point.

17. The information processing apparatus according to claim 1, wherein
the processor is configured to:
recognize a position of a work target from the acquired moving image; and
specify the boundary between the actions of the operator or determine a type of each action, based on a positional relationship between a position of a gazing point indicated by the detected eyeball movement and the position of the work target.

18. The information processing apparatus according to claim 17, wherein
the processor is configured to specify the boundary between the actions of the operator or determine the type of each action, based on whether the position of the gazing point is included in a predetermined region around the position of the work target.

19. The information processing apparatus according to claim 17, wherein
the processor is configured to:
determine coordinates representing the position of the work target; and
specify the boundary between the actions of the operator or determine the type of each action, based on a distance between the coordinates and the position of the gazing point.

20. The information processing apparatus according to claim 19, wherein
the processor is configured to correct the distance according to a moving direction of the position of the gazing point.

* * * * *